United States Patent [19]

Cox

[11] Patent Number: 4,878,366
[45] Date of Patent: Nov. 7, 1989

[54] LOCKING DEVICE FOR A VEHICLE WHEEL AND TIRE

[76] Inventor: Robert W. Cox, 5634 Foxcross Pl. SE., Stuart, Fla. 34997

[21] Appl. No.: 263,549

[22] Filed: Oct. 27, 1988

[51] Int. Cl.$^4$ ........................ E05B 73/00; B60R 25/00
[52] U.S. Cl. .......................................... 70/14; 70/19; 70/57; 70/226
[58] Field of Search ................ 70/14, 18, 19, 57, 58, 70/211, 212, 225-227

[56] References Cited

U.S. PATENT DOCUMENTS

| | | | |
|---|---|---|---|
| 1,347,262 | 7/1920 | Eichorn | 70/18 |
| 1,426,534 | 8/1922 | Baker | 70/14 X |
| 1,453,882 | 5/1923 | McHugh | 70/18 |
| 1,461,725 | 7/1923 | Cooper | 70/18 |
| 1,467,353 | 9/1923 | Childress | 70/227 X |
| 2,963,895 | 12/1960 | Thomas | 70/14 |
| 3,800,570 | 4/1974 | Kaplan | 70/18 |
| 3,889,497 | 6/1975 | Tuttle | 70/14 |
| 3,924,426 | 12/1975 | Zane et al. | 70/18 |
| 4,085,599 | 4/1978 | Fischer et al. | 70/14 |
| 4,135,374 | 1/1979 | Goral | 70/18 |
| 4,171,079 | 10/1979 | Dietlein et al. | 70/58 X |
| 4,257,248 | 3/1981 | Williams | 70/18 X |
| 4,294,088 | 10/1981 | Barr | 70/58 X |
| 4,760,718 | 8/1988 | Muramatsu et al. | 70/18 |
| 4,768,359 | 9/1988 | Wade | 70/14 |
| 4,819,462 | 4/1989 | Apsell | 70/226 X |

Primary Examiner—Gary L. Smith
Assistant Examiner—Suzanne L. Dino
Attorney, Agent, or Firm—Joseph W. Farley

[57] ABSTRACT

A locking device for preventing rotation of a vehicle wheel and tire unit comprises a U-shaped clamp insertable through the openings between spoke-like portions of a conventional wheel so that the base of the clamp engages one side of the wheel and a pair of threaded clamp members project through the openings outwardly of the other wheel side. A wheel rotation blocking bar is mounted on the clamp members, is urged by fastening nuts into compressive contact with the tire at chordally spaced locations, and has ends projecting beyond the outer circumference of the tire. Tabs, threaded on the clamp members and interconnected by a padlock, prevent removal of the device from the wheel and tire unit.

6 Claims, 1 Drawing Sheet

U.S. Patent
Nov. 7, 1989
4,878,366
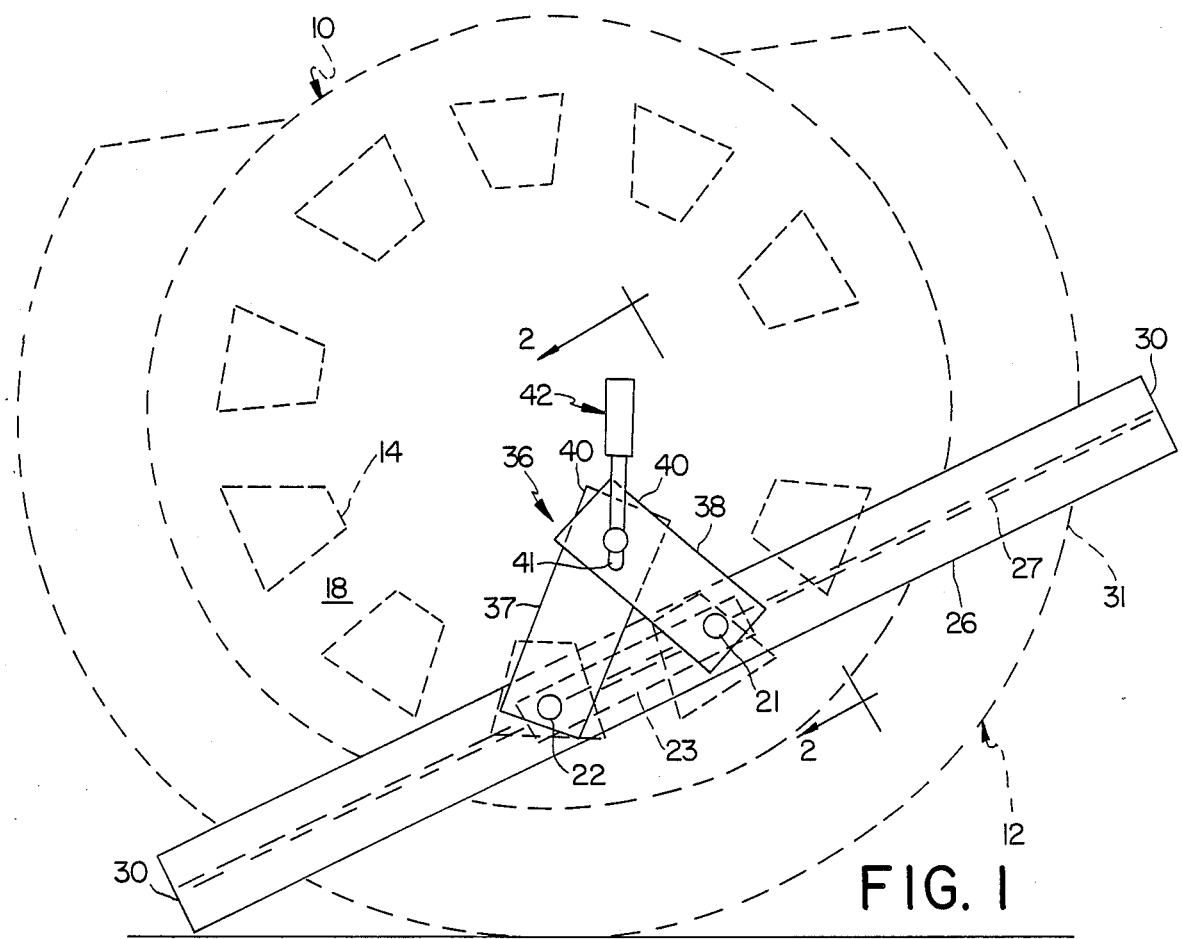
FIG. 1
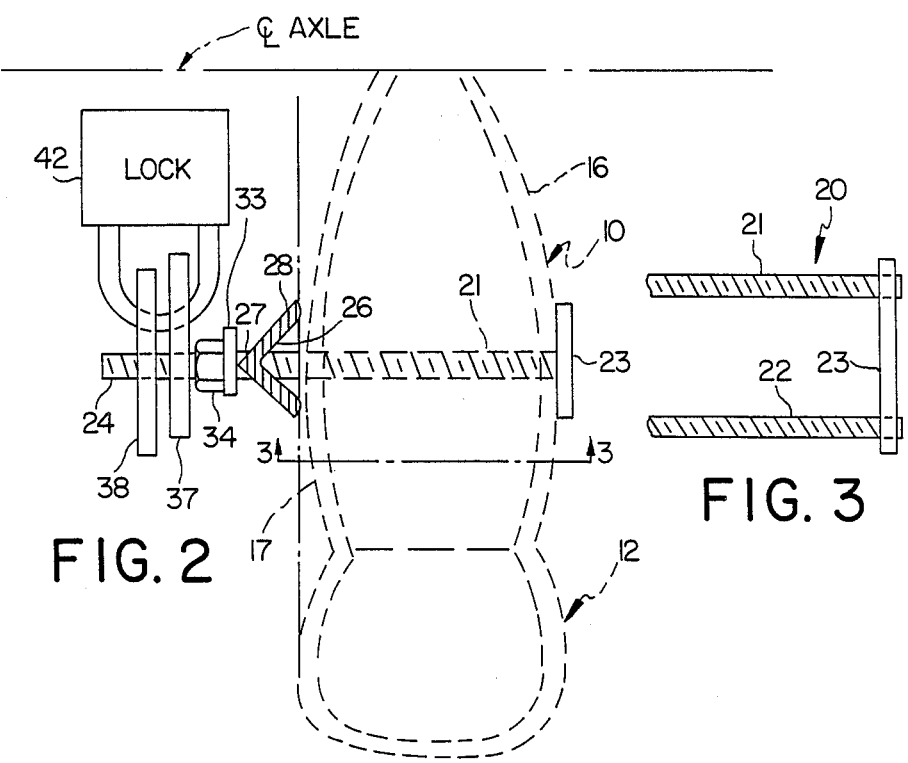
FIG. 2
FIG. 3

LOCKING DEVICE FOR A VEHICLE WHEEL AND TIRE

SUMMARY OF THE INVENTION

This invention relates to improvements in a device which can be secured and locked to a wheel and tire of a vehicle, such as a trailer, for immobilizing the vehicle by preventing free rotation of that wheel.

Trailers in widespread use for transporting personal belongings, for example boats, are conventionally not provided with any form of anti-theft protection. A trailer owner, for example the owner of a boat trailer when using the boat, generally leaves the trailer unattended and vulnerable to any thief in a towing vehicle with a hitch. The present invention provides a device which such a trailer owner can readily attach and lock to one trailer wheel and which will prevent the trailer from being moved.

The locking device of the invention, for use with a vehicle wheel and tire unit, comprises a U-shaped clamp having a pair of clamp members extending from a base portion in spaced apart relation and having threaded free ends adapted to be inserted through the conventional inter-spoke openings extending between the inner and outer sides of a vehicle wheel so that the base portion of the clamp is engageable with one of the wheel sides and the clamp members project outwardly of the other wheel side. A wheel rotation blocking bar is mountable on the clamp members in chordal relation to the wheel and tire and has a length such that one and preferably both ends of the blocking bar extend beyond the outer circumference of the tire. Fastening nuts placed on the threaded ends of the clamp members urge the blocking bar into frictional compressive contact with the tire at chordally spaced locations thereon. A pair of locking tabs is threaded onto the ends of the clamp members, each tab having a portion projecting radially from its respective clamp member. The tabs are positionable on the clamp members adjacent to the fastening nuts and with their radially projecting portions adjacent to each other. Apertures provided in the radially projecting portions enable them to be connected together by a padlock.

The tabs when connected together provide a locking means which prevents removal of the fastening nuts so that the device cannot be detached from the vehicle wheel on which it has been mounted. Any rotation of the wheel, as by attempted movement of the vehicle, will result in engagement between an extending end of the rotation blocking bar and the surface on which the vehicle is supported. This engagement will effectively prevent further rotation of the wheel, as the blocking bar is connected to the wheel by the clamp and is in frictional compressive contact with the tire.

Other features and advantages of the invention will appear from the description to follow of the embodiment shown in the accompanying drawings.

DESCRIPTION OF THE DRAWINGS

FIG. 1 is a side elevation of a schematically illustrated vehicle wheel and tire with the locking device of the invention installed thereon;

FIG. 2 is a sectional elevation taken as indicated by the line 2—2 of FIG. 1; and FIG. 3 is a detail, taken as indicated by the line 3—3 of FIG. 2, showing part of a clamp.

DESCRIPTION OF THE EMBODIMENT

Schematically shown in FIGS. 1 and 2 is a representative vehicle wheel 10 on which a tire 12 is mounted. Such a wheel 10 is conventionally provided with a number of openings 14 between the inner and outer sides 16 and 17 of the wheel, there being a spoke-like portion 18 of the wheel between adjacent openings 14. The foregoing elements illustrate the manner in which the components of locking device of the invention are employed.

The first of these components is a clamp 20 which includes a pair of clamp members 21 and 22 (FIG. 3) and a base portion 23 connecting the clamp members together, thus forming a U-shaped unit. The clamp members 21 and 22 extend from the base portion 23 in spaced apart, generally parallel relation and have threaded free ends 24. The clamp is proportioned so that its members 21 and 22 are each adapted to be inserted through one of the wheel openings 14, placing the base portion 23 in engagement with the inner side 16 of the wheel and the clamp members 21 and 22 projecting outwardly of the outer side 17 of the wheel.

A wheel rotation blocking bar 26 is mountable on the clamp members 21 and 22 in chordal relation to the wheel 10 and tire 12, as shown in FIG. 1. Preferably the bar 26 is an angle section bar having an apex portion 27, a pair of legs 28, and a length such that when mounted on the clamp members the ends 30 of the bar extend beyond the outer circumference 31 of the tire 12. Apertures formed in the apex portion 27 permit the bar 26 to be mounted as best shown in FIG. 2, with the apex 27 facing outwardly and the legs 28 facing inwardly.

A washer 33 and a fastening nut 34 are engageable with the threaded end 24 of each clamp member 21 and 22, and the nuts 34 when tightened urge the legs 28 of the blocking bar 26 into frictional compressive contact with the tire 12 at chordally spaced locations thereon.

The last component of the locking device is a locking means 36 detachably engageable with the clamp members 21 and 22 for preventing the removal of the fastening nuts 34. As shown, the locking means 36 comprises a pair of tabs 37 and 38 threadable on the clamp members 21 and 22, with each tab having a portion 40 projecting radially from the respective clamp member and provided with a slotted hole 41. The tabs 37 and 38 are positionable on the clamp members 21 and 22 outwardly of and immediately adjacent to the fastening nuts 34 and with their portions 40 in adjacent overlapping relation so that the tabs can be connected together by a padlock 42 inserted through the slotted holes 41, when aligned.

It is apparent that when a locking device so constructed is mounted on a vehicle wheel and tire unit as shown, free rotation of the unit is prevented. Also apparent is the relatively simple, inexpensive construction and ease of installation of the device.

I claim:

1. A locking device for preventing rotation of a vehicle supporting wheel having a tire mounted thereon, said device comprising:

a clamp including a pair of clamp members and a base portion connecting the clamp members at one end, said clamp members extending from the base portion in spaced apart relation and having threaded free ends adapted to be inserted through openings between the inner and outer sides of a vehicle wheel whereby said base portion is engageable with one of the wheel sides and said clamp members project outwardly of the other wheel side;

a wheel rotation blocking bar mountable on the free ends of said clamp members in chordal relation to the vehicle wheel and tire, said blocking bar having a length such that at least one end thereof extends beyond the outer circumference of the tire;

fastener means engageable with said clamp members for urging said blocking bar into frictional compressive contact with one side of the tire at two chordally spaced locations thereon; and locking means detachably engageable with said clamp members for preventing the removal of said fastener means therefrom.

2. A locking device according to claim 1 wherein said locking means comprises a pair of tabs, each tab being threadably engageable with the threaded free end of one of said clamp members and having a portion projecting radially therefrom, said tabs being positionable on said clamp members outwardly of and adjacent to said fastener means with said radially projecting portions adjacent to each other, and a lock for detachably connecting said radially projecting portions together.

3. A locking device according to claim 2 wherein said wheel rotation blocking bar is an angle-section bar having an apex portion and a pair of legs extending therefrom, apertures formed in said apex portion for engagement by said clamp members, said angle-section bar being mountable on said clamp members with the apex portion facing outwardly of the wheel and with the pair of legs extending inwardly into frictional compressive contact with the tire.

4. A locking device according to claim 2 wherein said radially projecting portions are positionable in overlapping relation with each other and are provided with apertures engageable by a conventional padlock.

5. A locking device according to claim 4 wherein said clamp is U-shaped.

6. A locking device according to claim 5 wherein the base portion of said clamp comprises a plate-like member secured to said clamp members in substantially perpendicular relation therewith.

* * * * *